United States Patent
Yuan et al.

(10) Patent No.: US 9,151,886 B2
(45) Date of Patent: Oct. 6, 2015

(54) OPTICAL THIN FILM AND EDGE-TYPE BACKLIGHT MODULE CONTAINING THE SAME

(71) Applicant: OPTIVISION TECHNOLOGY INC., Hsinchu (TW)

(72) Inventors: Kuang-Lin Yuan, Taichung (TW); Wen-Hao Liu, Kaohsiung (TW); Shih-Ming Chen, Tainan (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 0 days.

(21) Appl. No.: 14/318,960

(22) Filed: Jun. 30, 2014

(65) Prior Publication Data

US 2015/0146451 A1  May 28, 2015

(30) Foreign Application Priority Data

Nov. 22, 2013 (TW) .............................. 102221934 U
Jan. 27, 2014 (TW) .............................. 103201693 U

(51) Int. Cl.
  *F21V 5/00*  (2015.01)
  *G02B 5/02*  (2006.01)
  *F21V 8/00*  (2006.01)

(52) U.S. Cl.
  CPC .................................. *G02B 6/0051* (2013.01)

(58) Field of Classification Search
  CPC .... G02B 6/0051; G02B 6/0038; G02B 6/005; G02B 6/0053; G02B 27/2214
  USPC .......... 362/606, 362, 326, 330, 331, 334, 339
  See application file for complete search history.

(56) References Cited

U.S. PATENT DOCUMENTS 7,505,104 B2 * 3/2009 Watanabe et al. .............. 349/137

* cited by examiner

*Primary Examiner* — Joseph L Williams
(74) *Attorney, Agent, or Firm* — Nixon & Vanderhye P.C.

(57) ABSTRACT

An optical thin film includes: a transparent substrate including a first surface and a second surface which is opposite to the first surface; a first light-condensing layer formed on the first surface of the transparent substrate, the first light-condensing layer having a haze value ranging from 5% to 30% and a surface roughness ranging from 0.1 RMS to 1 RMS; and a second light-condensing layer formed on the second surface of the transparent substrate. The second light-condensing layer has a haze value ranging from 70% to 100% and a surface roughness ranging from 1 RMS to 10 RMS.

8 Claims, 7 Drawing Sheets

OPTICAL THIN FILM AND EDGE-TYPE BACKLIGHT MODULE CONTAINING THE SAME

CROSS-REFERENCE TO RELATED APPLICATION

This application claims priority of Taiwanese Application No. 103201693, filed on Jan. 27, 2014, and also claims priority of Taiwanese Application No. 102221934, which filed on Nov. 22, 2013.

BACKGROUND OF THE INVENTION

1. Field of the Invention

This invention relates to an optical thin film, more particularly to an optical thin film including first and second light-condensing layers having different haze values. This invention also relates to an edge-type backlight module containing the optical thin film.

2. Description of the Related Art

A conventional display normally includes a screen and a backlight module configured to project light on the screen.

FIG. 1 illustrates an edge-type backlight module 1 for a flat panel display (not shown). The edge-type backlight module 1 includes a light source 11, a light guide plate (LGP) 12 which is disposed at one side of the light source 11, a reflector 13 which is disposed at a bottom of the LGP 12, a diffuser 15 which is disposed on the LGP 12, a first prism sheet 16 which is disposed on the diffuser 15, and a second prism sheet 17 which is disposed on the first prism sheet 16.

When light generated by the light source 11 passes through the LGP 12 and into the diffuser 15, it is scattered by the diffuser 15 before passing through the first prism sheet 16 and the second prism sheet 17. The first and second prism sheets 16, 17 subsequently collect and condense the scattered light from the diffuser 15.

However, the first and second prism sheets 16, can only collect incident light which has an incident angle in the range of −40° to −60° and 40° to 60°. As such, a portion of the scattered light (with the incident angle being outside of the range) cannot be collected and used for projecting onto the screen, which results in a decrease in the lighting efficiency of the backlight module.

SUMMARY OF THE INVENTION

Therefore, an object of the present invention is to provide an optical thin film that can overcome the aforesaid drawback associated with the prior art.

According to one aspect of this invention, there is provided an optical thin film that comprises: a transparent substrate including a first surface and a second surface which is opposite to the first surface; a first light-condensing layer formed on the first surface of the transparent substrate and having a haze value ranging from 5% to 30% and a surface roughness ranging from 0.1 RMS to 1 RMS; and a second light-condensing layer formed on the second surface of the transparent substrate and having a haze value ranging from 70% to 100% and a surface roughness ranging from 1 RMS to 10 RMS.

According to another aspect of the present invention, there is provided an edge-type backlight module that comprises: a light source; a light guide plate disposed on one side of the light source; and an optical thin film disposed on the light guide plate and including a transparent substrate and first and second light-condensing layers. The transparent substrate has a first surface and a second surface which is opposite to the first surface. The first light-condensing layer is formed on the first surface of the transparent substrate. The second light-condensing layer is formed on the second surface of the transparent substrate. The first light-condensing layer has a haze value ranging from 5% to 30% and a surface roughness ranging from 0.1 RMS to 1 RMS, and the second light-condensing layer has a haze value ranging from 70% to 100% and a surface roughness ranging from 1 RMS to 10 RMS.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
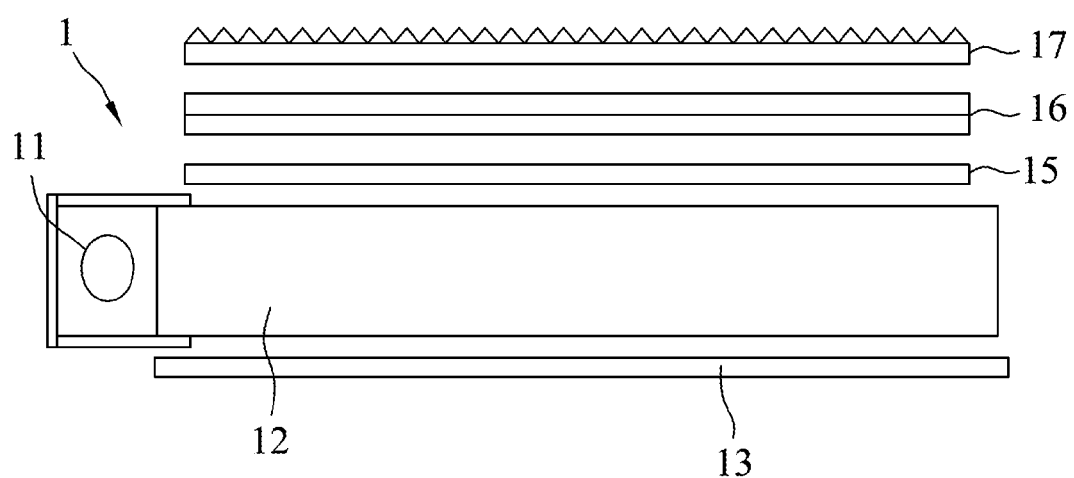
FIG. 1 is a schematic view of a conventional edge-type backlight module with a diffuser.
Figure 2:
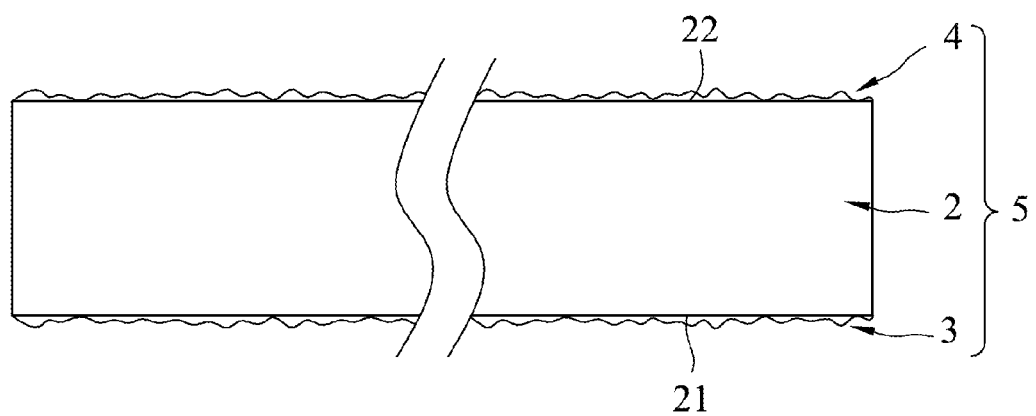
FIG. 2 is a schematic view of a preferred embodiment of an optical thin film according to the present invention.

FIG. 2 illustrates a preferred embodiment of an optical thin film 5 according to the present invention. The optical thin film 5 includes a transparent substrate 2, a first light-condensing layer 3, and a second light-condensing layer 4.

The transparent substrate 2 includes a first surface 21 and a second surface 22 which is opposite to the first surface 21.

The first light-condensing layer 3 is formed on the first surface 21 of the transparent substrate 2, and has a haze value ranging from 5% to 30% and a surface roughness ranging from 0.1 RMS to 1 RMS.

The second light-condensing layer 4 is formed on the second surface 22 of the transparent substrate 2, and has a haze value ranging from 70% to 100% and a surface roughness ranging from 1 RMS to 10 RMS.

The transparent substrate 2 is flexible, and may be made from polyethylene terephthalate (PET), polyethylene naphthalate (PEN), or polycarbonate (PC). In the preferred embodiment, the transparent substrate 2 is made from PET. Preferably, the first and second light-condensing layers 3, 4 are made by curing an ultraviolet light curable resin.

The ultraviolet light curable resin thus cured has a light scattering property, which renders the first and second light-condensing layers 3, 4 to have a hazy appearance. The haze value of the cured resin is related to a transmittance of the cured resin, and can be measured using a haze meter. The haze value is defined as the ratio of a diffuse transmittance to a total transmittance of a material of interest. The diffuse transmittance is the difference between the total transmittance and a specular transmittance of the material of interest.

In the preferred embodiment, the first light-condensing layer 3 and the second light-condensing layer 4 are attached to the transparent substrate 2 using a roll-to-roll technique. The roughness of each of the first and second light-condensing layers 3, 4 is created and controlled by impression techniques.

The first light-condensing layer 3 has a refractive index raging from 1.45 to 1.6. The second light-condensing layer 4 has a refractive index ranging from 1.45 to 1.60. The transparent substrate 2 has a refractive index ranging from 1.55 to 1.59.

Preferably, the refractive index of the first light-condensing layer 3 is the same as that of the second light-condensing layer 4. It is noted that the refractive index of the first light-condensing layer can be different from that of the second light-condensing layer 4 in other embodiments of this invention.

Figure 3:
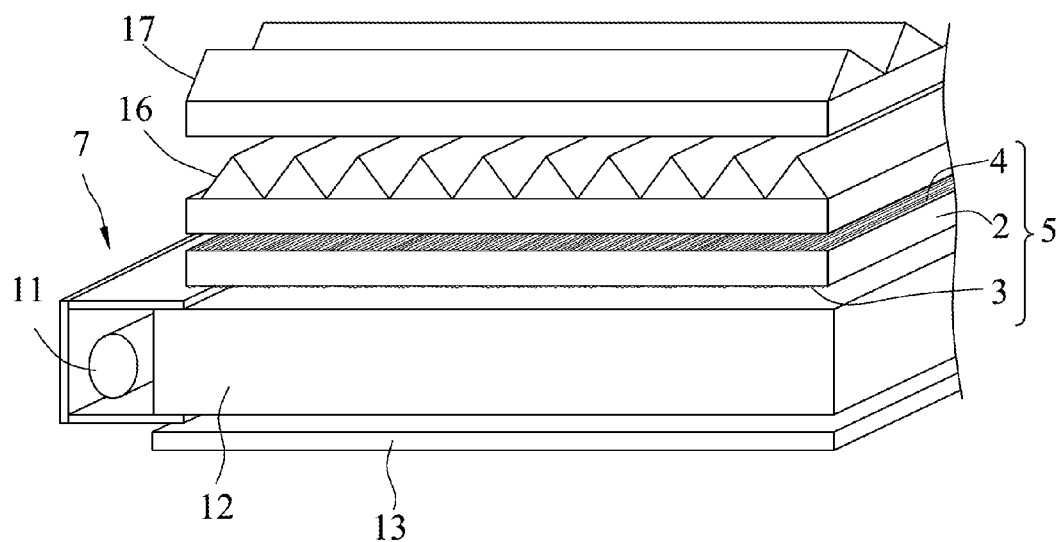
FIG. 3 is a schematic perspective view of a preferred embodiment of an edge-type backlight module according to the present invention.

FIG. 3 illustrates the configuration of an edge-type backlight module 7 that includes the optical thin film 5 of the preferred embodiment. The edge-type backlight module 7 further includes a light source 11 and a light guide plate 12 which is disposed on one side of the light source 11. The optical thin film 5 is disposed on the light guide plate 12.

The edge-type backlight module 7 further includes a reflector 13 which is disposed at a bottom of the light guide plate 13, a first linear prism sheet 16 which is disposed on and attached to the optical thin film 5, and a second linear prism sheet 17 which is disposed on and attached to the first linear prism sheet 16. The first linear prisms 16 and the second linear prism sheet 17 are perpendicular to one another.

Combination of the first and second condensing layers 3, 4 renders the optical thin film 2 thus formed to have a function of scattering light such that most of the scattered light have an incident angle to the first prism sheet 16 being in a range that enables collection by the first and second prism sheets 16, 17.

The merits of the preferred embodiments of this invention will become apparent with reference to the following Examples and Comparative Examples.

An edge-type backlight module 7 including the optical thin film 5 but without the first and second linear prism sheets 16, 17 for each of Examples 1 and 2 and Comparative Examples 1 and 2 was prepared. An edge-type backlight module 7 including the optical thin film 5 and the first and second prism sheets 16, for each of Examples 3 and 4 and Comparative Examples 3 and 4 was prepared. In addition, an edge-type backlight module 7 including a conventional diffuser (which was formed by doping particles in a transparent substrate) without the first and second linear prism sheets 16, 17 for Comparative Example 5 was prepared, and with the first and second linear prism sheets 16, 17 for Comparative Example 6 was prepared.

Table 1 shows the haze value and the roughness of the first and second light-condensing layers 3, 4 of each of Examples 1 to 4 and Comparative Examples 1 to 4. $H_1$ represents the haze value of the first light-condensing layer 3, $R_1$ represents the roughness of the first light-condensing layer 3, $H_2$ represents the haze value of the second light-condensing layer 4, and $R_2$ represents the roughness of the second light-condensing layer 4. The first light-condensing layer 3 and the second light-condensing layer 4 have the same refractive index of 1.48.

TABLE 1

|  | $H_1$ (%) | $R_1$ (RMS) | $H_2$ (%) | $R_2$ (RMS) |
|---|---|---|---|---|
| Example 1 | 5 | 0.1 | 70 | 1 |
| Example 2 | 30 | 1 | 100 | 10 |
| Example 3 | 5 | 0.1 | 70 | 1 |
| Example 4 | 30 | 1 | 100 | 10 |
| Comparative Example 1 | 2 | 0.04 | 65 | 0.8 |
| Comparative Example 2 | 40 | 1.5 | 100 | 15 |
| Comparative Example 3 | 2 | 0.04 | 65 | 0.8 |
| Comparative Example 4 | 40 | 1.5 | 100 | 15 |

Figure 4:
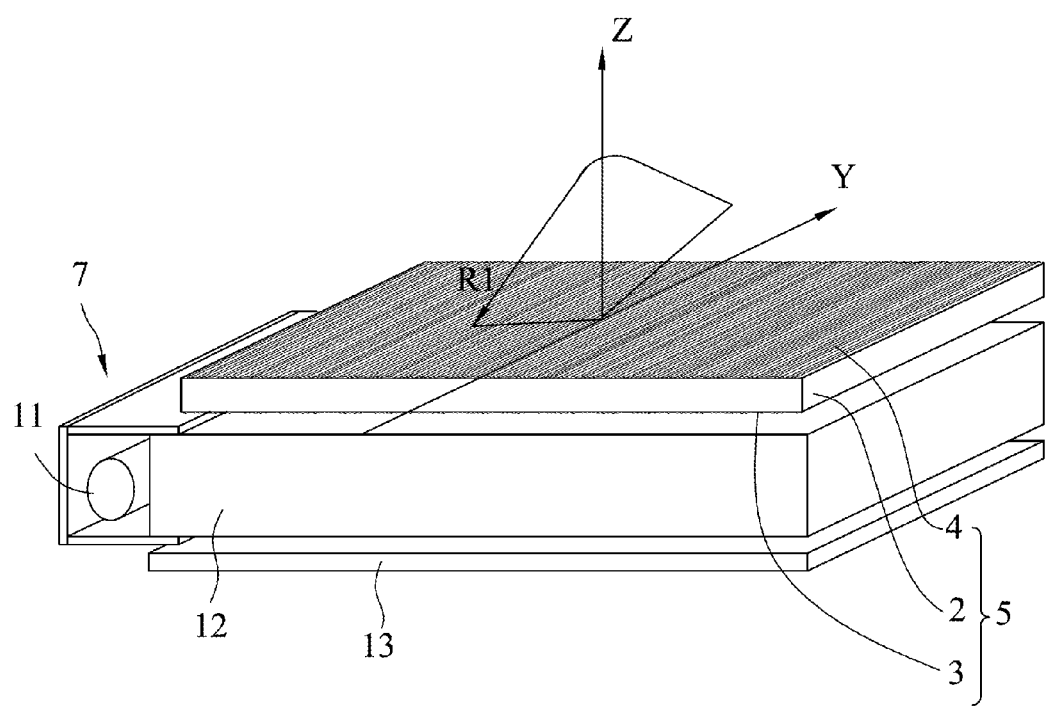
FIG. 4 is a schematic perspective view illustrating how a horizontal viewing luminance of the backlight module of the present invention is measured using a luminance meter.

FIG. 4 illustrates how a horizontal viewing luminance of a backlight module is measured using a luminance meter moving in a horizontal viewing angle manner. In the horizontal viewing angle manner, the luminance meter is moved along a horizontal viewing path R1 on a Y-Z plane (defined by Y and Z axes) parallel to a length of the light source 11.

Figure 5:
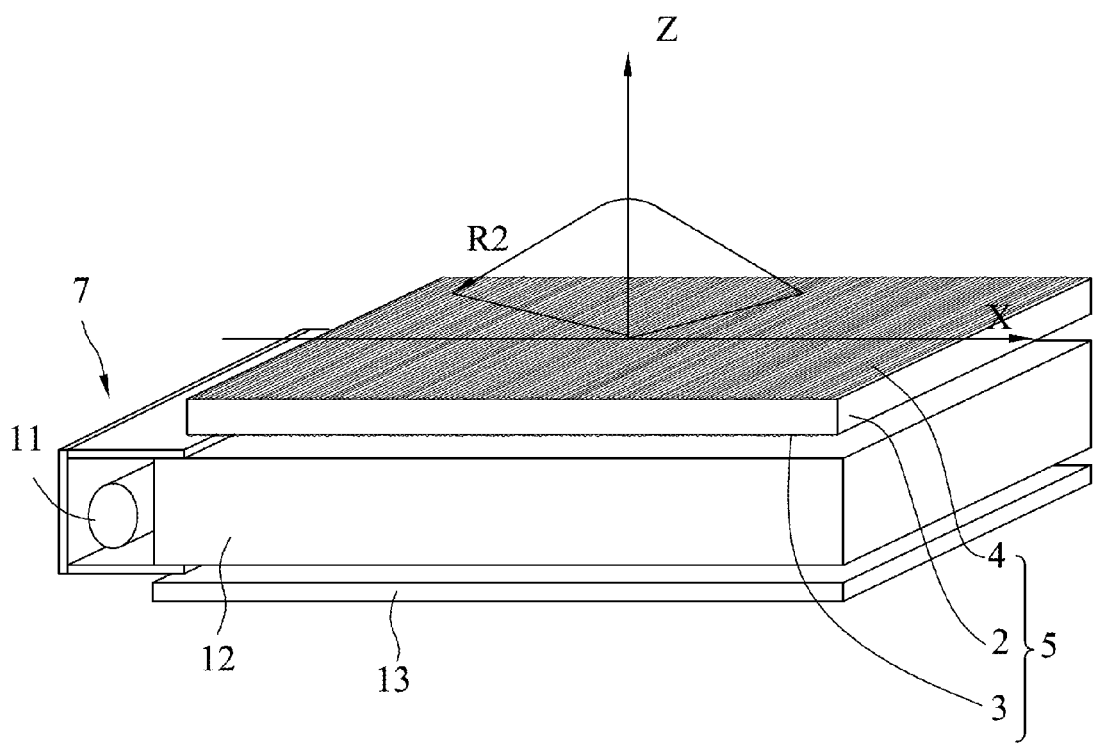
FIG. 5 is a schematic perspective view illustrating how a vertical viewing luminance of the backlight module of the present invention is measured using the luminance meter.

FIG. 5 illustrates how a vertical viewing luminance of the backlight module is measured using the luminance meter moving in a vertical viewing angle manner. In the vertical viewing angle manner, the luminance meter is moved along a vertical viewing path R2 on a X-Z plane (defined by X and Z axes) perpendicular to the length of the light source 11.

Figure 6:
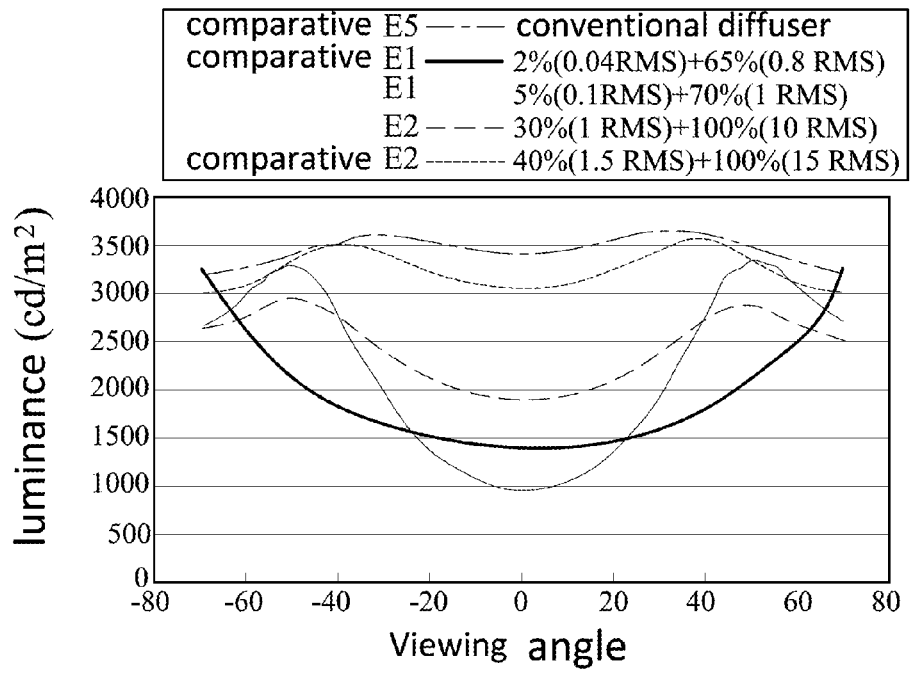
FIG. 6 is a plot showing the horizontal viewing luminance of Examples and Comparative Examples of an edge-type backlight module in which a prism sheet is not included.
Figure 7:
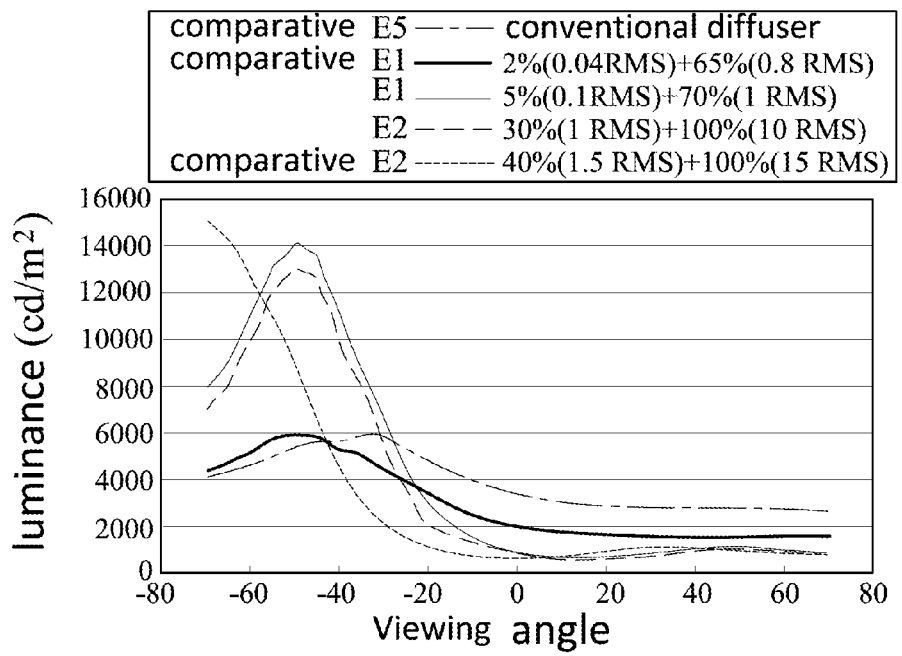
FIG. 7 is a plot showing the vertical viewing luminance of Examples and Comparative Examples of an edge-type backlight module in which a prism sheet is not included.

FIG. 6 is a plot showing the horizontal viewing luminance of Examples 1 and 2 and Comparative Example 1, 2 and 5. FIG. 7 is a plot showing the vertical viewing luminance of Examples 1 and 2 and Comparative Examples 1, 2 and 5. The vertical viewing luminance of Examples 1 and 2 at an angle of −40° to −60° with respect to Z-axis is greater than that of Comparative Examples 1, 2 and 5. Therefore, FIGS. 6 and 7 demonstrate that the optical thin film 5 of the preferred embodiment can scatter more light into a scattered light with an incident angle to the first linear prism sheet 16 in the range of −40° to −60° and 40° to 60°.

Figure 8:
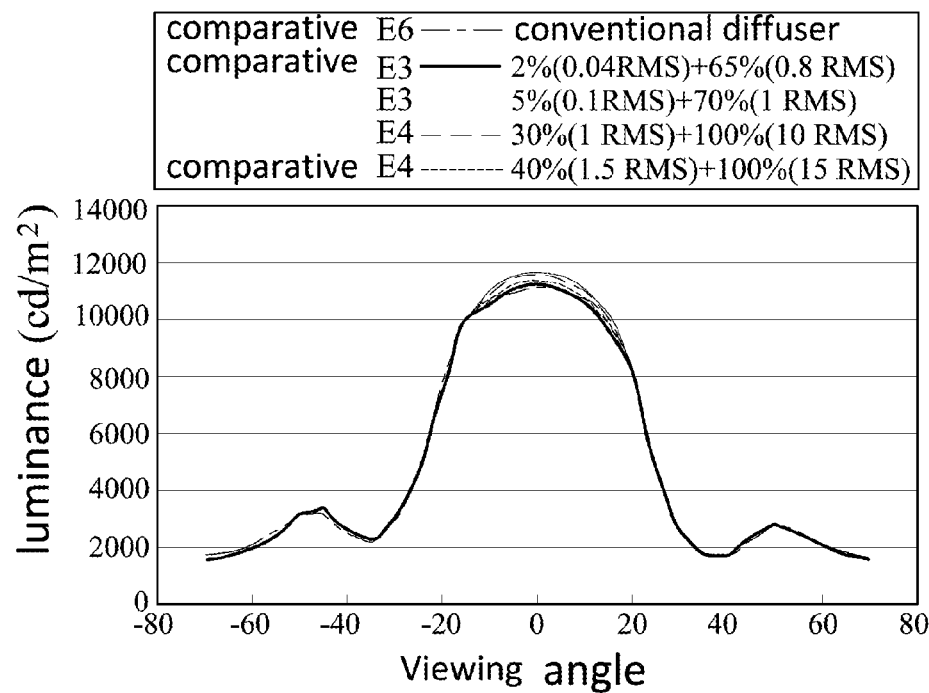
FIG. 8 is a plot showing the horizontal viewing luminance of Examples and Comparative Examples of an edge-type backlight module in which two prism sheets are included.
Figure 9:
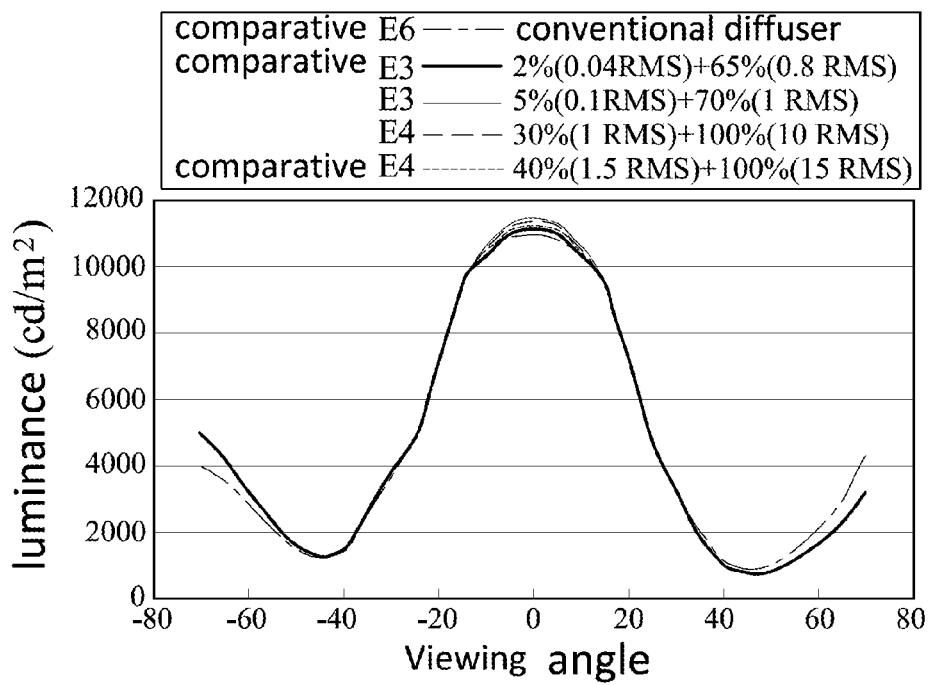
FIG. 9 is a plot showing the vertical viewing luminance of Examples and Comparative Examples of an edge-type backlight module in which two prism sheets are included.

FIG. 8 is a plot showing the horizontal viewing luminance of Examples 3 and 4 and Comparative Examples 3, 4 and 6. FIG. 9 is a plot showing the vertical viewing luminance of Examples 3 and 4 and Comparative Examples 3, 4 and 6. The horizontal viewing luminance of Examples 3 and 4 at an angle of −40° to 60° with respect to X-axis is greater than that of Comparative Examples 3, 4 and 6, which demonstrates the optical thin film 5 of the preferred embodiment can scatter more light into a scattered light with an incident angle to the first linear prism sheet 16 in the range of −40° to −60° and 40° to 60°.

With the inclusion of the optical thin film 5 in the edge-type backlight module 7 of the present invention, the aforesaid drawback associated with the prior art can be alleviated.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An optical thin film comprising:
  a transparent substrate including a first surface and a second surface which is opposite to said first surface;
  a first light-condensing layer formed on said first surface of said transparent substrate and having a haze value ranging from 5% to 30% and a surface roughness ranging from 0.1 RMS to 1 RMS; and a second light-condensing layer formed on said second surface of said transparent substrate and having a haze value ranging from 70% to 100% and a surface roughness ranging from 1 RMS to 10 RMS.

2. The optical thin film of claim 1, wherein said first light-condensing layer and said second light-condensing layer are made from an ultraviolet light curable resin.

3. The optical thin film of claim 2, wherein said first light-condensing layer and said second light-condensing layer have the same refractive index.

4. The optical thin film of claim 1, wherein said transparent substrate is flexible.

5. An edge-type backlight module comprising:
a light source;
a light guide plate disposed on one side of said light source; and
an optical thin film disposed on said light guide plate and including a transparent substrate and first and second light-condensing layers, said transparent substrate having a first surface and a second surface which is opposite to said first surface, said first light-condensing layer being formed on said first surface of said transparent substrate, said second light-condensing layer being formed on said second surface of said transparent substrate, said first light-condensing layer having a haze value ranging from 5% to 30% and a surface roughness ranging from 0.1 RMS to 1 RMS, and said second light-condensing layer having a haze value ranging from 70% to 100% and a surface roughness ranging from 1 RMS to 10 RMS.

6. The edge-type backlight module of claim 5, further comprising first and second linear prism sheets, said first linear prism sheet being attached to said optical thin film, said second linear prism sheet being attached to said first linear prism sheet, said first and second linear prism sheets being perpendicular to each other.

7. The edge-type backlight module of claim 5, wherein said first light-condensing layer and said second ultraviolet light resin.

8. The edge-type backlight module of claim 5, wherein said transparent substrate is flexible.

\* \* \* \* \*